Jan. 13, 1942.                    F. C. WAPPLER                    2,269,962
                                  OPHTHALMOSCOPE
                              Filed Sept. 28, 1939                2 Sheets-Sheet 1
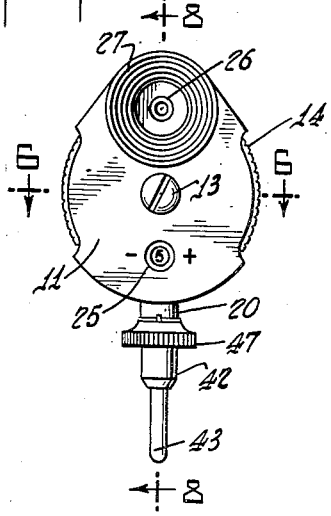
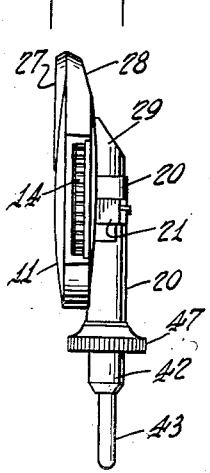
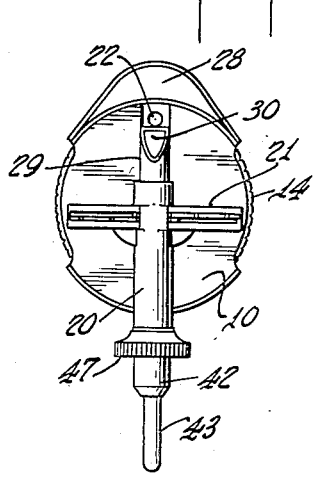
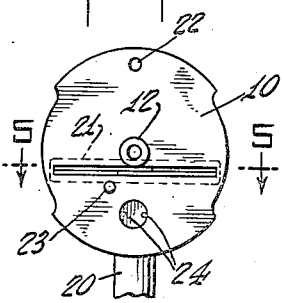
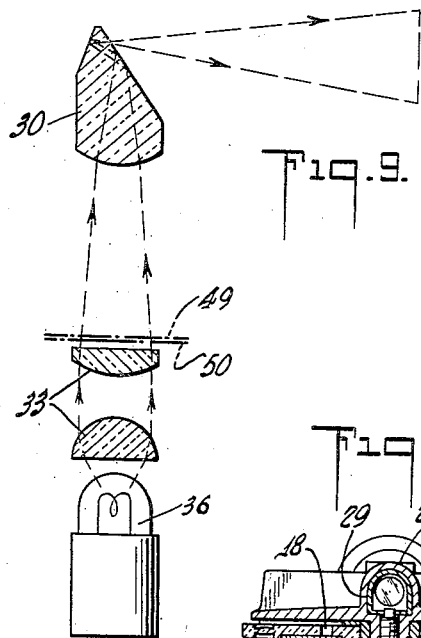
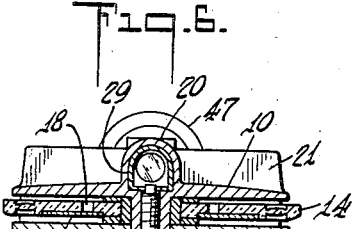
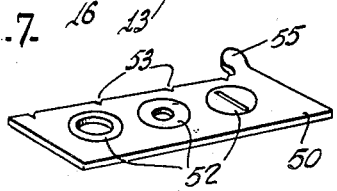
INVENTOR
Frederick Charles Wappler
BY
Gluck & Breitenfeld
ATTORNEYS Jan. 13, 1942.                F. C. WAPPLER                    2,269,962
                              OPHTHALMOSCOPE
                           Filed Sept. 28, 1939              2 Sheets-Sheet 2

Fig. 8.

INVENTOR
Frederick Charles Wappler
BY
Bluck & Breitenfeld
ATTORNEYS

Patented Jan. 13, 1942

2,269,962

UNITED STATES PATENT OFFICE 2,269,962

OPHTHALMOSCOPE

Frederick Charles Wappler, New York, N. Y.

Application September 28, 1939, Serial No. 296,884

3 Claims. (Cl. 88—22)

My present invention relates generally to ophthalmoscopes and has particular reference to certain structural and optical improvements.

The general object of the invention is to provide an improved construction which is of simplified nature from a manufacturing and assembling standpoint, which is unusually staunch, compact, and workmanlike in character, and which is easier and more reliable to use.

A more particular object is to provide an ophthalmoscope in which the beam of light which is directed into the patient's eye may be selectively modified both as to chromatic quality and as to cross-sectional nature, and it is a particular feature of my invention to provide a means for allowing these alterations in the beam of light to be simultaneously effected.

Another object of the invention is to improve the optical system whereby greater and more uniform efficiency is attained. In this connection, it is a particular feature of the invention to provide a reflecting medium, a source of light, and a pair of convex lenses arranged to direct a beam of light to the reflecting medium, the various parts being accurately maintained in proper predetermined relationship at all times.

Further improvements reside in the supporting and loading means for the electric lamp that is employed, in an improvement which accentuates the locality of the sight opening, and in the general structural arrangement of the various elements of the device.

I achieve these general objects and advantages, and such other objects and advantages as may hereinafter appear or be pointed out, in the manner illustratively shown in the accompanying drawings in which:

Figure 1 is a front elevational view of an ophthalmoscope constructed in accordance with the present invention, Figure 2 is a side view of Figure 1, Figure 3 is a rear view of Figure 1, Figure 4 is a front elevational view of the rear supporting plate by itself, Figure 5 is an enlarged cross-sectional view taken substantially along the line 5—5 of Figure 4, Figure 6 is a cross-sectional view taken substantially along the line 6—6 of Figure 1, Figure 7 is a perspective view of one of the improved slides shown by itself, Figure 8 is a greatly enlarged cross-sectional view taken substantially along the line 8—8 of Figure 1, and Figure 9 is a diagrammatic view, drawn substantially to scale, showing the improved optical system.

The ophthalmoscope comprises a back supporting plate 10 (shown most clearly in Figure 4), a front cover plate 11 (Figure 1), a tubular lug or pivot 12 preferably mounted on the plate 10, thereby holding the two plates in spaced relation, and a stud 13 which enters the pivot 12 and thus holds the two plates and all the intermediate parts together.

Rotatably mounted on the pivot 12 is the lens disk 14, the periphery of which is preferably knurled and partially exposed so that it may be rotated by the operator. This disk may be of any usual construction, but I prefer to make a disk of a single integral piece of resinous material, preferably transparent, with the various lenses 15 molded in one piece with the disk. As will be understood by those familiar with this art, these lenses are arranged in a circle concentric with the pivot, and are of differing dioptric characteristics. In the preferred construction, the disk has an annular recess in which a member 16 may be accommodated, this member bearing indicia arranged in a concentric circle with respect to the lenses 15, the indicia bearing a definite relationship to the lenses. The proper positioning of the member 16 is preferably provided for by a positioning projection 17 formed on the disk 14 and engaging within a hole or recess in the member 16.

The disk is also provided with a series of openings or recesses 18 adapted to engage with a spring-pressed detent, as the disk is rotated, so as to hold the disk yieldably in successive positions. The disk is preferably mounted between washers 19 whereby it is freely rotatable around the pivot 12.

On the back of the supporting plate 10 there is a tubular housing 20 which accommodates the optical system. This housing is preferably formed of an integral part of the plate 10. It is intersected by a transverse housing 21 the function of which will be presently described.

In Figure 4 there is shown the usual aperture 22 through which the operator looks when he is using the instrument. At 23 I have shown the spring-pressed detent which engages with the holes 18, and at 24 I have indicated two small perforations in the plate 10 through which a portion of the light from the lamp in the housing 20 may pass.

On the cover plate 11 there is an opening 25 which is so positioned that the indicia on the member 16 are successively visible as the lens disk is rotated. This opening is preferably in substantial alignment with the perforations 24, whereby a portion of the light from the lamp, after passing through the perforations 24, may serve to illuminate the indicia that is visible through the opening 25.

On the cover plate 11 there is also a sight opening 26, which is in alignment with the aperture 22, and it is at this point that the lenses 15 successively position themselves, so that the operator looks through the particular lens that is in position, the dioptric properties of the particular lens being indicated by the indicia which shows at that time through the opening 25.

One of the features of the present invention is to provide an attention-arresting indicator on the plate 11 to accentuate the locality of the sight opening 26. This makes it simpler for the inexperienced user to recognize the manner in which the instrument is to be held, and the opening to which his eye is to be applied. Preferably, this indicator takes the form shown in the present drawings in which I have illustrated a crater-like formation 27 which is concentric with the sight opening 26. Preferably, also, this crater-like formation may be distinctively colored, so that it looks like the conventional optical eye-piece. In order to provide space for this formation, the cover plate 11 is purposely provided with the upward extension 28.

Another feature of the invention relates to the optical system arranged within the housing 20. This system is shown diagrammatically in Figure 9, and the mechanical arrangement of the parts is illustrated most clearly in Figure 8.

Referring to Figure 8, it will be observed that in the upper end of the housing 20 a sleeve 29 is mounted, this sleeve supporting the reflecting medium or prism 30. This prism is arranged closely adjacent to the aperture 22 and is adapted to cast a beam of illumination into a direction in alignment with this aperture as shown most clearly in Figure 9. The sleeve 29 is held in secure predetermined position by providing a hole or recess in the sleeve and forming a rear extension 31 on the stud 13, this extension being adapted to enter the hole or recess and thus lock the sleeve 29 in proper position.

Within the tubular housing 20, behind the prism sleeve 29, there is a sleeve 32 which supports the two spaced convex lenses 33, preferably arranged with their plane surfaces outwards. These lenses are thus maintained at all times in proper spaced relationship. They are introduced into the housing 20 from the rear end, and since the sleeve 32 can enter no further than the transverse housing 21, the lenses 33 are thus accurately maintained in proper spaced relation to the prism 30.

Behind the sleeve 32 there is a spacer sleeve 34, this sleeve being provided with a slit or opening 35 to permit the light from the lamp to pass to and through the perforations 24 previously described.

Behind the spacer sleeve 34 there is a removable lamp assembly which comprises the usual bulb 36 and a conductive sleeve 37. This sleeve is adapted to fit snugly but slidably into the housing 20 so that the forward edge of the sleeve abuts against the rear edge of the spacer sleeve 34. The latter thus serves as an internal rearwardly directed shoulder, and maintains the lamp at proper predetermined position with respect to the lenses 33.

The lamp bulb 36 may be cemented or similarly retained within the sleeve 37, and one terminal of the filament is purposely brought into electrical connection (diagrammatically illustrated at 38) with the sleeve 37, while the other terminal is led in insulated relation to a rear center contact 39 (diagrammatically illustrated at 40).

The rear end of the housing 20 is externally threaded, and is provided with a longitudinal slot 41. This permits the removable application of a binding post which comprises the outer sleeve-like terminal 42, and the inner rod-like terminal 43. A sheath of insulation 44 encircles the rod 43, and at the inner end of this rod there is a compression spring 45 and a spring-pressed contact member or terminal 46.

A rotatable union member 47 is internally threaded and adapted to engage with the rear end of the housing 20. A projection 48 on the member 42 enters the slot 41 and thus helps to position the binding post in the desired manner.

The advantages of this mode of construction are numerous. One is that the lamp may be replaced with unusual ease and dispatch. For example, when the lamp is to be replaced, the union 47 is rotated to release the binding post, the lamp then slides out of the housing rearwardly, a new lamp may be loaded by simply allowing it to slide into the housing, and the binding post is then replaced. The spacer sleeve 34 and the housing 20 are made of electrically conductive material, so that when the binding post is screwed into position, an electrical connection is immediately established between the binding post terminal 42 and the sleeve 37, hence with the lamp terminal 38, and another insulated electrical connection is immediately established between the binding post terminal 43—46 and the contact 39, hence with the lamp terminal 40.

Another advantage arises from the employment of the two convex lenses 33. The conjoint purpose of these lenses is two-fold, viz., (a) to assimilate as much as possible of the light given off by the lamp and transform it into a beam of light, and (b) to bring this beam to a focus substantially at the exiting surface of the prism 30. In the ordinary ophthalmoscope, where only one lens is used, both of these purposes cannot be simultaneously accomplished, because an increase of light intensity requires the lens to be as close to the lamp as conditions permit, while the desired focusing of the beam requires that the lens be moved away from the lamp. As a result, ordinary ophthalmoscopes are made with a single lens which is adjustable in position, thereby allowing the lens to be shifted to a position of compromise. The user of an ophthalmoscope is, however, not skilled in making such adjustments, and a desire to intensify the beam usually results in impaired uniformity of the spot of light that is thrown into the patient's eye.

By means of the present arrangement, the parts are all in proper fixed relationship at all times, so that the optical system works at maximum efficiency. One of the lenses 33 is sufficiently close to the lamp to gather a maximum amount of light, and the other lens transforms this light into a beam, as shown most clearly in Figure 9, in which the focus is substantially at the exiting surface of the prism. The spot of light which is thrown is therefore always unimpaired by any image of the lamp filament, and is uniform in light-distribution, and of highly desirable intensity, under all conditions.

This makes the beam of light particularly adapted for alteration in chromatic quality and in cross-sectional nature, and this is accomplished, in accordance with the present invention, in the manner illustrated most clearly in Figures 5 and 7.

Mounted in the transverse housing 21 are the two superposed slides 49 and 50. Each is independent of the other, and may be individually shifted in its own plane. The slide 49 is provided with inserts such as those indicated at 51. These inserts are adapted to affect the chromatic quality of the beam into which they are interposed, between the lamp and the reflecting medium of the optical system. For example, one of these inserts 51 may be of clear glass or its equivalent, another may be of a tinted glass adapted to impart "daylight" qualities to the beam, while another may be tinted to make the resultant beam "red-free."

The other slide 50 is illustrated by itself in Figure 7 and may accommodate inserts 52 which affect the cross-sectional nature of the beam. For example, as shown in the drawings, one of these inserts may transform the beam into a slit shape, another may produce a relatively large circular spot, while the third may produce a relatively small circular spot. Since the slides are independently adjustable, any desired chromatic quality may be selectively imparted to the beam in combination with any selected cross-section.

To facilitate the adjustments of the slides 49 and 50 each is preferably provided along one edge with notches 53, and there is a small spring 54 in fixed positional relation to each slide and shaped to provide fingers which yieldably snap into and out of the notches 53 when the slide is moved. Preferably, each slide has a projection 55 by means of which it may be shifted, these projections extending rearwardly out of the transverse housing 21.

In general, it will be understood that changes in the details, herein described and illustrated for the purpose of explaining the nature of my invention, may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In an ophthalmoscope, a substantially circular supporting plate with an aperture near its edge, a tubular housing carried by said plate, an optical system mounted in said housing for directing a beam of light into alignment with said aperture, a spaced cover plate provided with a sight opening aligned with said aperture, a lens disc concentrically mounted for rotation between said plates and provided with different lenses adapted to be brought successively into alignment with said sight opening and aperture, said cover plate having an extension adjacent to said sight opening, and an attention-arresting indicator accentuating the locality of said sight opening, said indicator comprising a crater-like depression formed in said cover plate and cover plate extension concentric with said sight opening, said depression having a diameter relatively large with respect to the diameter of said sight opening.

2. In an ophthalmoscope, a supporting plate with an aperture, a spaced cover plate provided with a sight opening aligned with said aperture, a lens disc mounted for rotation between said plates and provided with different lenses adapted to be brought successively into alignment with said sight opening and aperture, a tubular housing carried by said supporting plate, an optical system mounted in said housing for directing a beam of light into alignment with said aperture, said optical system including a lamp in the lower portion of the housing and a reflecting prism mounted in the end of the housing adjacent to said aperture, a transverse housing carried by said supporting plate and intersecting the tubular housing between the lamp and the prism, and means slidably mounted in said transverse housing and interposed in the beam of light from said lamp for affecting the nature of said beam, said tubular housing and said transverse housing being formed of one piece with each other and with said supporting plate.

3. In an ophthalmoscope, a supporting plate with an aperture, a spaced cover plate provided with a sight opening aligned with said aperture, a lens disc mounted for rotation between said plates and provided with different lenses adapted to be brought successively into alignment with said sight opening and aperture, a stud securing said cover plate to said supporting plate, a tubular housing carried on the rear side of said supporting plate, a reflecting prism, a sleeve supporting said prism and mounted in one end of said housing, an extension on said stud for engaging said sleeve to lock it in a predetermined position, a pair of convex lenses, a sleeve supporting said lenses in predetermined spaced relationship and mounted in said housing at a predetermined distance behind said prism sleeve, a lamp mounted in said housing behind said lens sleeve, and a spacer sleeve between the lamp sleeve and the lens sleeve to maintain the lamp in predetermined spaced relation to said lenses, said lamp, lenses, and prism constituting a fixed optical system for directing a beam of light into alignment with said aperture.

FREDERICK CHARLES WAPPLER.